(12) United States Patent
Shivappa (10) Patent No.: US 11,891,026 B1
(45) Date of Patent: Feb. 6, 2024

(54) REVERSE THRUST BRAKING SYSTEM

(71) Applicant: KING FAISAL UNIVERSITY, Al-Ahsa (SA)

(72) Inventor: Anil Bangalore Shivappa, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/198,185

(22) Filed: May 16, 2023

(51) Int. Cl.
*B60T 1/12* (2006.01)

(52) U.S. Cl.
CPC .................. *B60T 1/12* (2013.01)

(58) Field of Classification Search
CPC ......... B60T 1/12; B60G 2202/45; F02K 1/60; F02K 1/605; F02K 1/62; F02K 1/625
See application file for complete search history.

(56) References Cited

U.S. PATENT DOCUMENTS

| | | | |
|---|---|---|---|
| 2,620,622 A * | 12/1952 | Lundberg | F02K 1/60 |
| | | | 239/265.37 |
| 3,099,433 A | 7/1963 | Wagner et al. | |
| 3,250,496 A | 5/1966 | Mason | |
| 3,433,317 A | 3/1969 | Peterson | |
| 3,587,973 A * | 6/1971 | Wolf | F02K 1/383 |
| | | | 239/265.19 |
| 3,719,256 A | 3/1973 | Clark | |
| 3,837,411 A * | 9/1974 | Nash | F02K 1/822 |
| | | | 60/761 |
| 5,706,651 A * | 1/1998 | Lillibridge | F02K 1/48 |
| | | | 239/127.3 |
| 5,987,880 A * | 11/1999 | Culbertson | F02K 1/70 |
| | | | 244/110 B |
| 2003/0075374 A1 * | 4/2003 | Feldman | B60T 1/12 |
| | | | 180/274 |
| 2005/0172631 A1 | 8/2005 | Primlani | |
| 2017/0276139 A1 | 9/2017 | Ishiba | |

FOREIGN PATENT DOCUMENTS

| | | | | |
|---|---|---|---|---|
| CA | 2955792 C | * | 5/2022 | ............. B64D 37/32 |
| DE | 1780530 A1 | * | 2/1970 | ................ B60T 1/12 |
| DE | 2220372 A1 | * | 11/1973 | ................ B60T 1/12 |
| DE | 2500351 A1 | | 7/1976 | |
| WO | WO-03045749 A1 | * | 6/2003 | ................ B60T 1/12 |

OTHER PUBLICATIONS

STIC translation DE 1780530 A1. (Year: 1970).*
EPO translation DE 2220372 A1, (Year: 1973).*
Machine translation CA 2955792C. (Year: 2022).*

* cited by examiner

*Primary Examiner* — Thomas J Williams
(74) *Attorney, Agent, or Firm* — Nath, Goldberg & Meyer; Richard C. Litman (57) ABSTRACT

A reverse thrust braking system includes an inlet having propeller fan blades that accelerate air coming into the system. A plurality of chambers receive the air accelerated through the inlet by the propeller fan blades. An exit point receives air from at least one of the plurality of chambers and exhausts the air from the system. The exit point exhausts air at an angle to create a reverse thrust.

19 Claims, 7 Drawing Sheets

REVERSE THRUST BRAKING SYSTEM

BACKGROUND

1. Field

The present disclosure relates to braking systems, and particularly to a reverse thrust braking system and method.

2. Description of the Related Art

Road safety is an important concern in everyday life, especially on highways where drivers are driving at high speeds. Drivers may lose control of a vehicle in emergency situations leading to accidents and loss of life. Present day braking systems employed in vehicles on the road, especially on the highway, include hydraulic systems and ABS systems, for effective breaking. The high speeds, at which drivers operate vehicles on the highways, however, may make it difficult to stop a vehicle effectively, using a hydraulic or ABS system, during emergency braking situations.

Accordingly, further solutions effective for braking at high speeds solving the aforementioned problems are desired.

SUMMARY

There is a need for an effective braking system to increase road safety and prevent loss of life. Hydraulic and ABS systems are not sufficient in stopping a vehicle moving at a high rate of speed. A modification of the reverse thrust system to halt an aircraft after landing, can be employed in vehicles used on highways. This modified reverse thrust system uses the Continuity equation for incompressible fluids to control and increase the velocity of the air entering the device. Sensors are used to detect the need for braking at high speed to help effectively halt a vehicle in a controlled manner, along with the braking systems already in use, during emergency braking situations. In one application, the modified reverse thrust system can be incorporated on either side of a vehicle to bring the vehicle effectively to a controlled halt, during an emergency braking situation.

A reverse thrust braking system, in one embodiment, includes an inlet having propeller fan blades that accelerate air coming into the system. A plurality of chambers arranged linearly receive the air accelerated through the inlet by the propeller fan blades. An exit point receives air from at least one of the plurality of chambers and exhausts the air from the system. The exit point exhausts air at an angle to create a reverse thrust. In an embodiment, the exit point receives air from a last chamber in the linearly arranged plurality of chambers.

The reverse thrust braking system can further include a plurality of vertical bars. Each of the plurality of vertical bars are located between two adjacent chambers of the plurality of chambers. Each of the plurality of vertical bars are narrower than each of the plurality of chambers, and creates an initial variable velocity of the air.

The plurality of chambers creates different velocities of air in each of the plurality of chambers. When the air reaches the exit point, the velocity of the air within the system equalizes, and the velocity of the air being exhausted increases, thereby creating the reverse thrust.

The reverse thrust braking system further includes a sensor, that when activated, initiates the inflow of air into the inlet, and accelerates the air with the propeller fan blades.

A reverse thrust braking method includes receiving air at an inlet having propeller fan blades; accelerating the air coming into the system with the propeller fan blades; receiving the air accelerated by the propeller fan blades through a plurality of linearly arranged chambers; receiving air from at least one of the plurality of chambers at an exit point; and exhausting the air from the exit point at an angle to create a reverse thrust. In an embodiment, the exit point receives air from a last chamber in the linearly arranged plurality of chambers.

The air is accelerated through a plurality of vertical bars. Each of the plurality of vertical bars can be located between two adjacent chambers of the plurality of chambers. Each of the plurality of vertical bars can be narrower than each of the plurality of chambers.

The plurality of chambers can create an initial variable velocity of the air. The plurality of chambers can create different velocities of air in each of the plurality of chambers. When the air reaches the exit point, the velocity of air within the system equalizes, and the velocity of the air being exhausted increases, thereby creating the reverse thrust.

The reverse thrust braking method further includes activating a sensor that initiates the inflow of air into the inlet, and accelerates the air with the propeller fan blades.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Hydraulic and ABS systems are not sufficient in stopping road vehicles moving at a high rate of speed. A modification of the reverse thrust system to halt an aircraft, after landing, can be employed in vehicles used on highways including any one or more of, by way of non-limiting example, cars, vans, trucks, sport utility vehicles, motorcycles, buses, and the like. This modified reverse thrust system uses the Continuity equation for incompressible fluids—to control and increase the velocity of the air entering the device. Sensors are used to detect the need for braking at high speed to help effectively halt a vehicle in a controlled manner, along with the braking systems already in use, during emergency braking situations. In one application, the modified reverse thrust system is incorporated on either side of the vehicle to bring the vehicle effectively to a controlled halt, during an emergency braking situation.

The present concept includes employing a reverse thrust system in light and heavy road vehicles that would bring the vehicles safely to a halt, with the help of sensors, in emergency situations. This technique may be effective when implemented with other braking systems already in use. This concept will prevent accidents from happening, to some extent.

Figure 1:
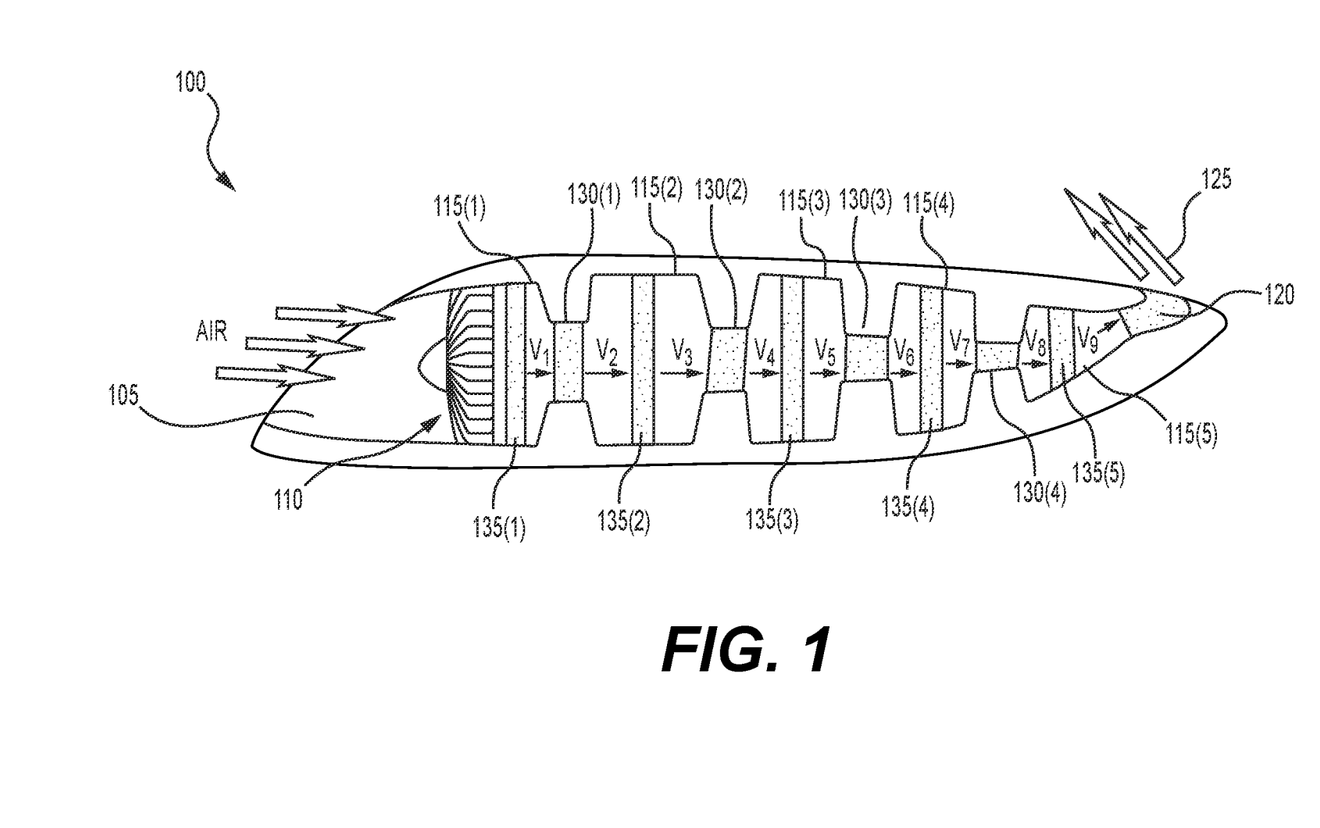
FIG. 1 is an illustration of a reverse thrust braking system.

FIG. 1 is an illustration of a reverse thrust braking system 100 that includes an inlet 105 having propeller fan blades 110 that accelerate air coming into the system. The propeller fan blades 110 can be made of titanium or aluminum, and allow for movement of the air in only one direction.

A plurality of chambers 115(1),115(2),115(3),115(4),115(5) receive the air accelerated through the inlet 105 by the propeller fan blades 110. As shown in the configuration of FIG. 1, the plurality of chambers can be arranged linearly, such that air leaving a first chamber can enter a second chamber, air exiting the second chamber can enter a third chamber, and so on. An exit point 120 receives air from at least one of the plurality of chambers 115(1),115(2),115(3), 115(4),115(5) and exhausts the air from the system. The exit point 120 exhausts air at an angle to create a reverse thrust 125. The air is accelerated by the propeller fan blades 110, in one direction through the plurality of chambers 115(1), 115(2),115(3),115(4),115(5), and exhausted out through the exit point 120 at an angle to create the reverse thrust 125. In the configuration of FIG. 1, the system has five (5) different chambers. Other configurations having other numbers of chambers are further contemplated herein.

The reverse thrust braking system 100 further includes a plurality of vertical bars 130(1),130(2),130(3), 130(4). Each of the plurality of vertical bars 130(1),130(2),130(3), 130(4) are located between two adjacent chambers of the plurality of chambers 115(1),115(2),115(3), 115(4),115(5). The plurality of vertical bars 130(1),130(2),130(3), 130(4) can be tapered to reduce the velocity of the peripheral airflow and to increase the velocity of the central stream of air. Each of the plurality of vertical bars can be narrower than each of the plurality of chambers, and create an initial variable velocity of the air v1,v2,v3,v4,v5,v6,v7,v8,v9. The velocity of the air initially varies between v1 and v9. This change in velocity (v1-v9) initially may contribute to the reducing speed of the vehicle.

Bars 135(1),135(2),135(3),135(4),135(5) represent a cubic foot of air along different areas of the system.

The plurality of chambers 115(1),115(2),115(3),115(4), 115(5) creates different velocities of air in each of the chambers. When the air reaches the exit point 120, the velocity of the air within the system equalizes, and the velocity of the air being exhausted increases, thereby creating the reverse thrust 125.

Figure 2:
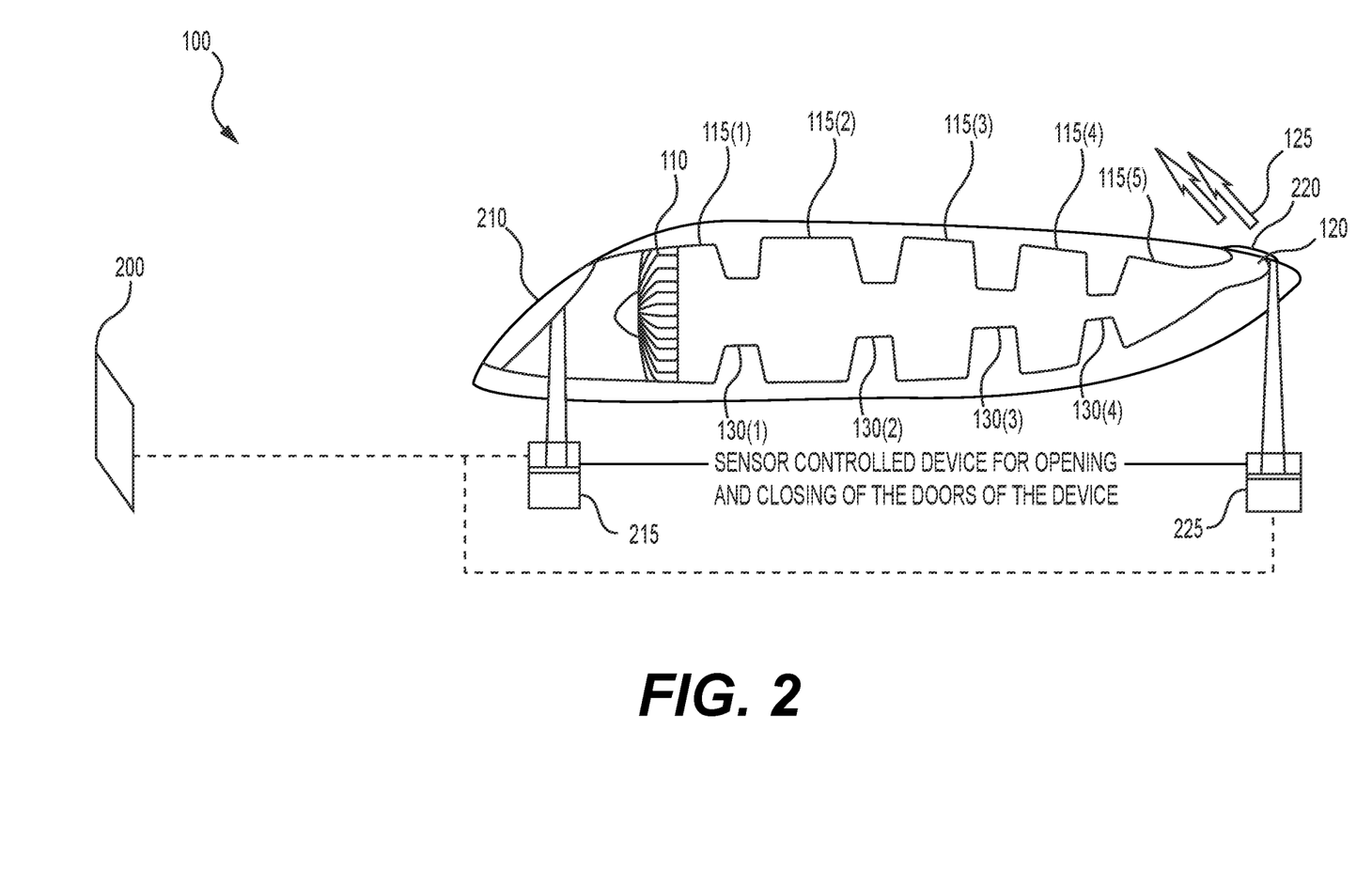
FIG. 2 is an illustration of the reverse thrust braking system that includes a sensor.

FIG. 2 is an illustration of the reverse thrust braking system 100 that includes a sensor 200, that when activated opens a front door 210 in the present system, through front door controller 215, and a back door 220 in the present system, through back door controller 225. When the front door 210 is opened, the sudden inflow of air, in the opposite direction, is forced through the inlet 105. The propeller fan blades 110 accelerates the air through the plurality of chambers 115(1),115(2),115(3),115(4),115(5).

The plurality of vertical bars 130(1),130(2),130(3), 130(4) located between two adjacent chambers of the plurality of chambers 115(1),115(2),115(3), 115(4),115(5) creates an initial variable velocity of the air. Each of the plurality of vertical bars 130(1),130(2),130(3), 130(4) can be tapered to reduce the velocity of the peripheral airflow and to increase the velocity of the central stream of air.

The sensor 200 controls the opening of the back door 220 through back door controller 225. When the back door 220 is opened, air is exhausted from the exit point 120 at an angle to create the reverse thrust 125.

Figure 3A:
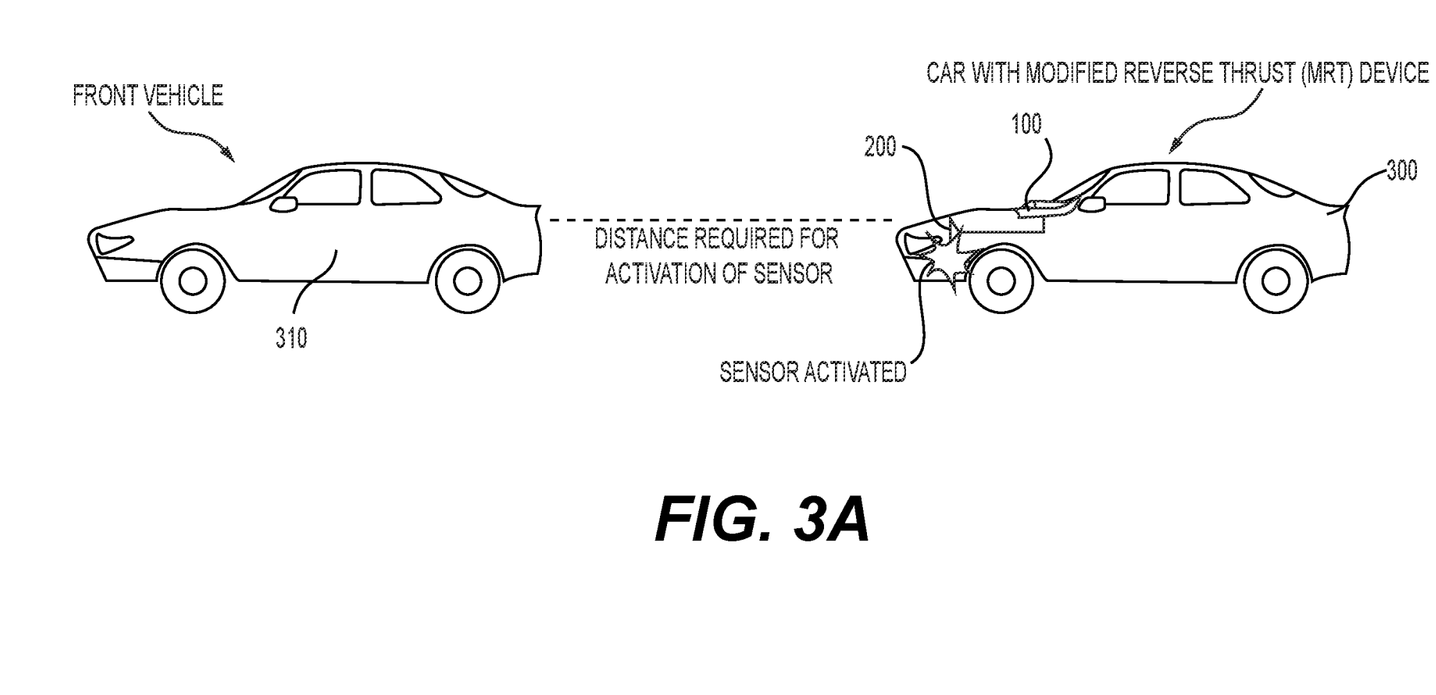
FIGS. 3A to 3D illustrate the operation of a reverse thrust braking system.
Figure 3B:
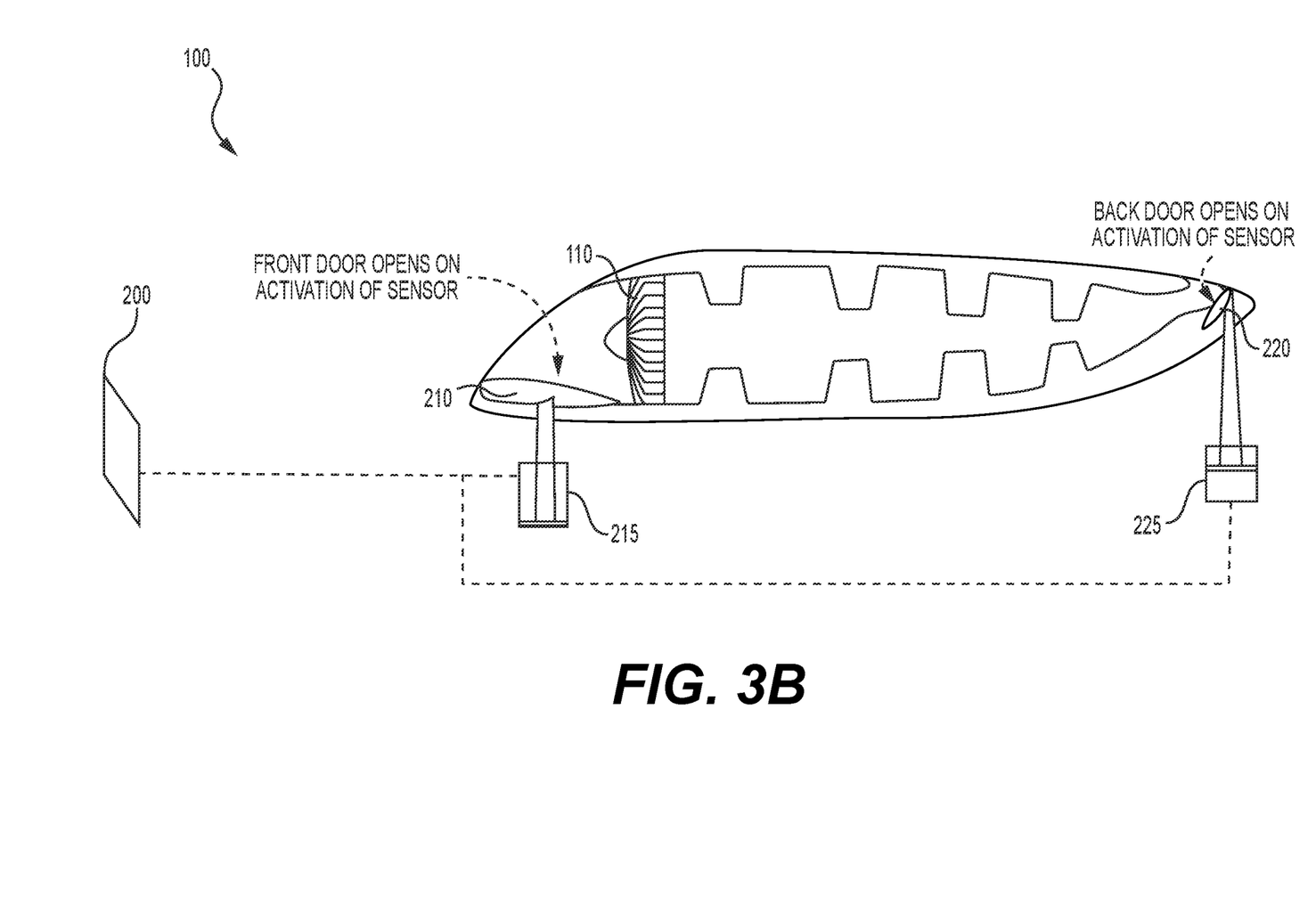

FIGS. 3A to 3D illustrate the operation of a reverse thrust braking system 100 operating in a vehicle 300. As illustrated in FIG. 3A, vehicle 300 is equipped with a reverse thrust braking system 100. As vehicle 300 approaches vehicle 310, the sensor 200 of the reverse thrust braking system 100 is activated. The front door 210 and the back door 220 are opened, as illustrated in FIG. 3B, through front door controller 215 and back door controller 225, when the sensor 200 is activated.

Figure 3C:
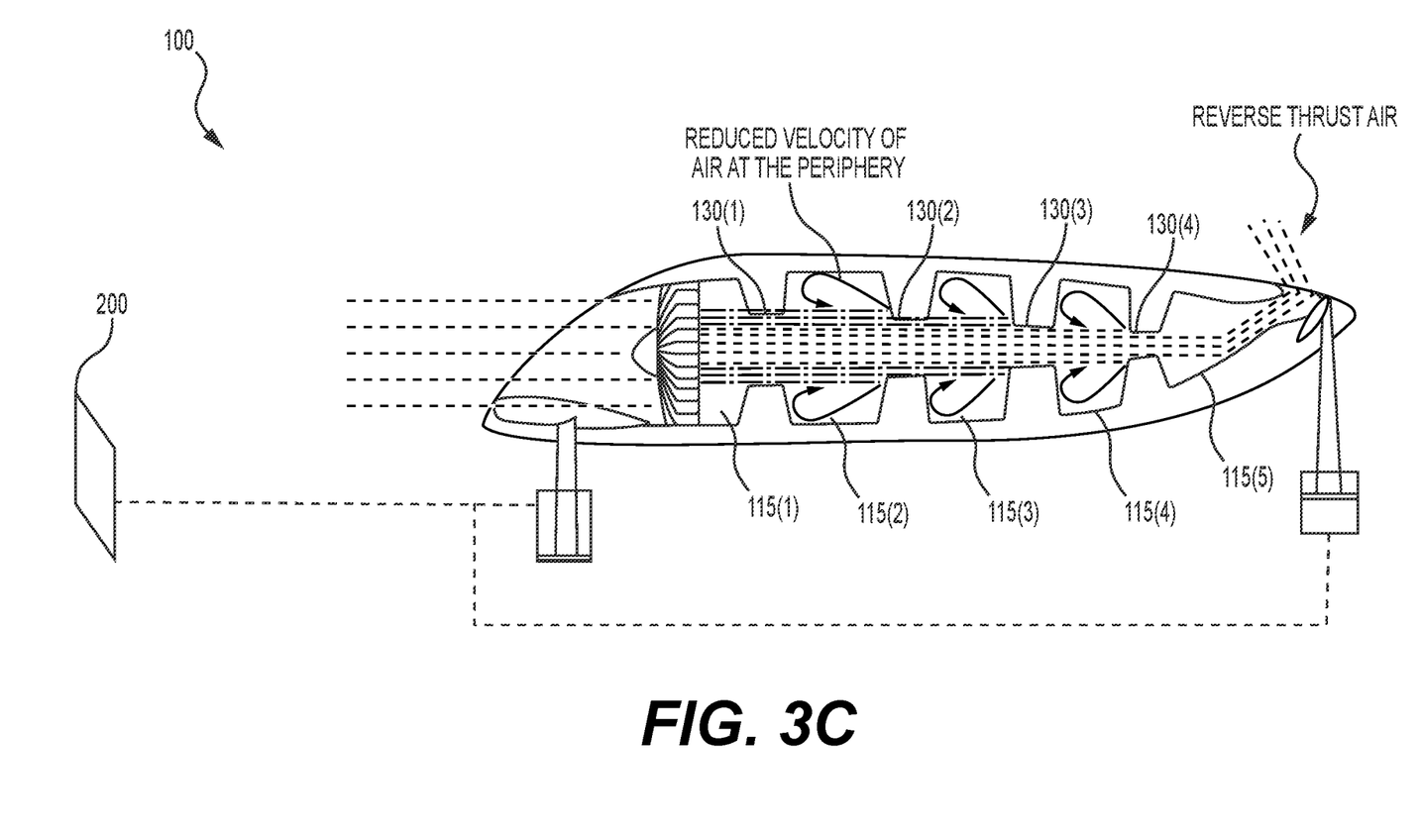

When the front door 210 is opened, the propeller fan blades 110 accelerates the air through the plurality of chambers 115(1),115(2),115(3),115(4),115(5). There is an initial variable velocity of air going through the chambers. Each of the plurality of vertical bars 130(1),130(2),130(3), 130(4) reduces the velocity of the peripheral airflow and increases the velocity of the central stream of air as illustrated in FIG. 3C. A reverse thrust of air is then exhausted at an angle through exit point 120.

Figure 3D:
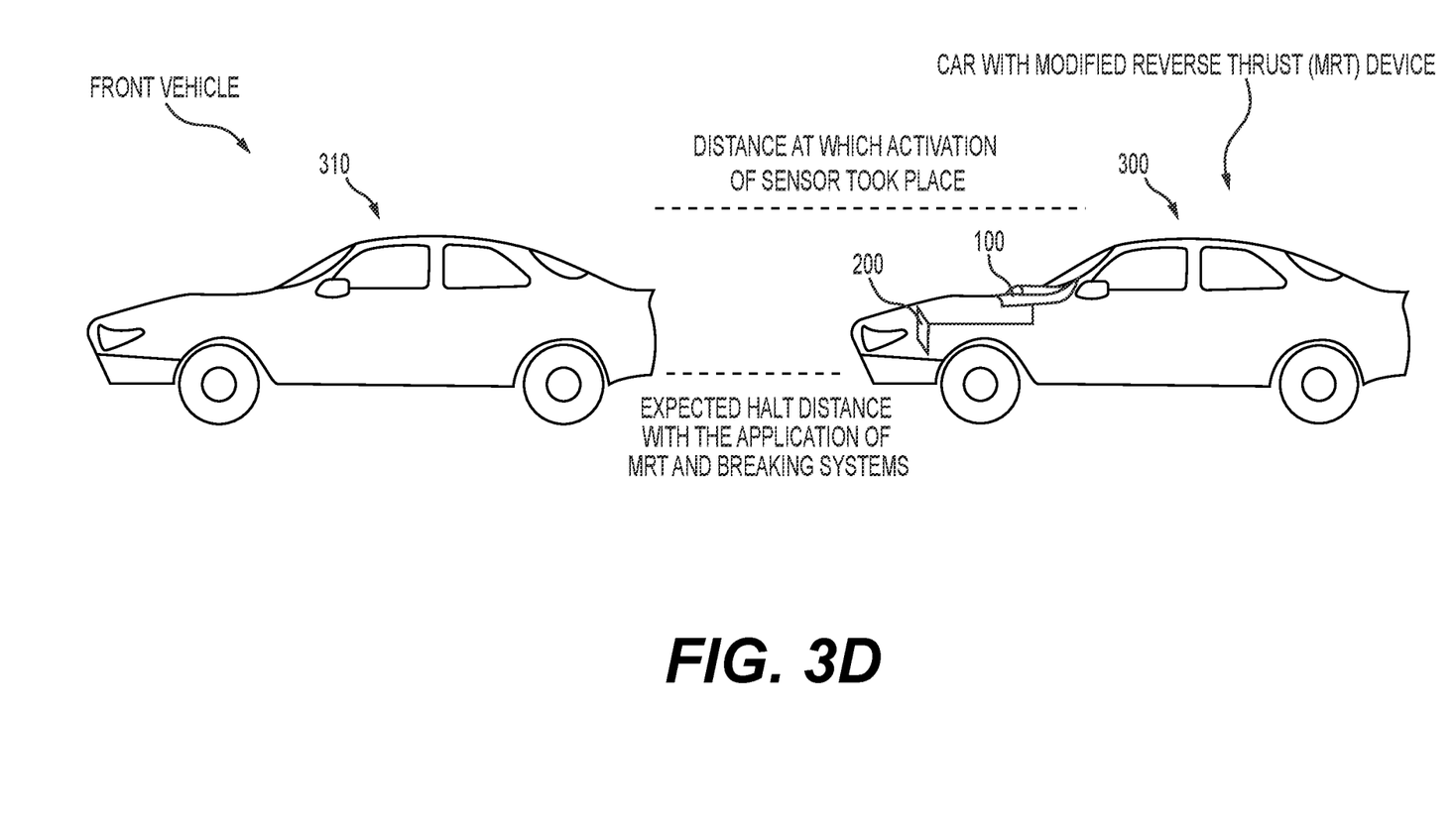

FIG. 3D shows the reduced distance between vehicle 300, equipped with the reverse thrust braking system 100, and vehicle 310, located in front of vehicle 300. The reverse thrust braking system 100: (i) accelerates the air using the propeller fan blades 110, (ii) Creates variable velocity of the initial air entering the device, with the help of the design, and (iii) later creates the high velocity air that exits the device to create the reverse thrust 125. ABS or hydraulic brakes can be additionally implemented to further reduce the braking distance.

Accordingly, in one embodiment, the modified reverse thrust system can be incorporated on either side of a vehicle to bring the vehicle effectively to a controlled halt, during an emergency braking situation, as shown by the positioning of the reverse thrust braking system 100 on the car in FIGS. 3A and 3D. In another embodiment, the modified reverse thrust system can be incorporated on either side of the vehicle to bring the vehicle effectively to a controlled halt. In an embodiment, the point on the vehicle where the modified reverse thrust system is to be placed can be configured to incorporate a high strength, or an ultra-high strength, stainless steel housing to which the present modified reverse thrust system can be fitted. Such a stainless steel housing may already be present in many vehicles, or many vehicles can be easily retrofitted to include such a stainless steel housing.

Figure 4:
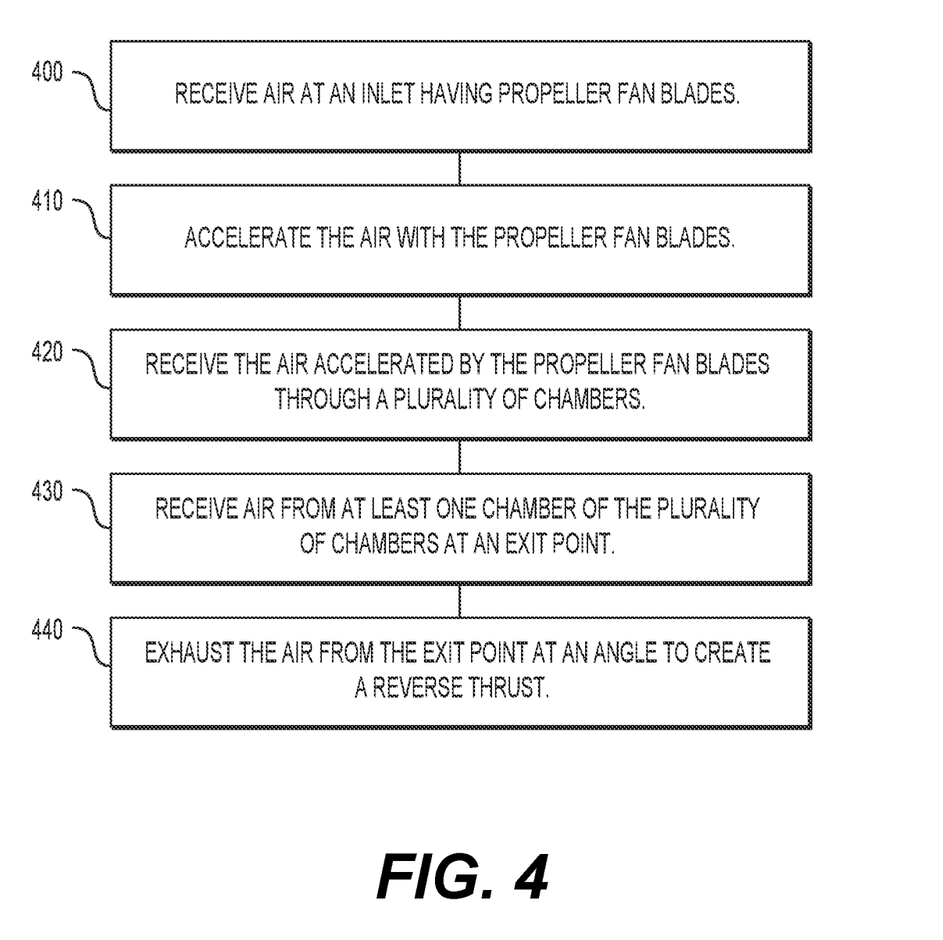

FIG. 4 is a flow diagram of a reverse thrust braking method. Air is received at an inlet having propeller fan blades in step 400. Air coming into the system is accelerated with the propeller fan blades in step 410. A plurality of chambers, in step 420, receives the air accelerated by the propeller fan blades. In step 430 air is received from at least one of the plurality of chambers at an exit point. The air is then exhausted, in step 440, from the exit point at an angle to create a reverse thrust.

The air can further be accelerated through a plurality of vertical bars. Each of the plurality of vertical bars can be located between two adjacent chambers of the plurality of chambers. Each of the plurality of vertical bars can be narrower than each of the plurality of chambers.

The plurality of chambers creates an initial variable velocity of the air. The plurality of chambers creates different velocities of air in each of the plurality of chambers. When the air reaches the exit point, the velocity of air within the system equalizes, and the velocity of the air being exhausted increases creating the reverse thrust.

The reverse thrust braking method further includes activating a sensor that initiates the inflow of air into the inlet, and accelerates the air with the propeller fan blades.

It is to be understood that the reverse thrust braking system and method is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A reverse thrust braking system, comprising:
   an inlet having propeller fan blades that accelerate air coming into the system;
   a plurality of chambers arranged linearly that receive air accelerated through the inlet by the propeller fan blades, wherein each of the plurality of chambers is downstream of the propeller fan blades;
   a plurality of bars, each of the plurality of bars located between any adjacent two chambers of the plurality of chambers; and
   an exit point that receives air from at least one of the plurality of chambers and exhausts the air from the system, the exit point exhausting air at an angle to create a reverse thrust without combustion.

2. The reverse thrust braking system as recited in claim 1, wherein the plurality of bars comprise a plurality of vertical bars.

3. The reverse thrust braking system as recited in claim 2, wherein the each of the plurality of vertical bars are narrower than each of the plurality of chambers.

4. The reverse thrust braking system as recited in claim 1, wherein the plurality of chambers creates an initial variable velocity of the air.

5. The reverse thrust braking system as recited in claim 1, wherein the plurality of chambers creates different velocities of air in each of the plurality of chambers.

6. The reverse thrust braking system as recited in claim 1, wherein when the air reaches the exit point, velocity of the air within the system equalizes, and velocity of the air being exhausted increases, thereby creating the reverse thrust.

7. The reverse thrust braking system as recited in claim 1, further comprising a sensor that, when activated, initiates inflow of air into the inlet, and accelerates the air with the propeller fan blades.

8. The reverse thrust braking system as recited in claim 1, configured to be mounted on both sides of a vehicle.

9. A reverse thrust braking method, comprising:
   receiving air at an inlet of a system having propeller fan blades;
   accelerating the air coming into the system with the propeller fan blades;
   receiving the air accelerated by the propeller fan blades through a plurality of linearly arranged chambers, wherein each of the plurality of linearly arranged chambers is downstream of the system having the propeller fan blades;
   receiving air from at least one of the plurality of chambers at an exit point; and
   exhausting the air from the exit point at an angle to create a reverse thrust without combustion,
   wherein the air is accelerated through a plurality of bars, each of the plurality of bars located between any adjacent two chambers of the plurality of chambers.

10. The reverse thrust braking method as recited in claim 9, wherein the plurality of bars comprise a plurality of vertical bars.

11. The reverse thrust braking method as recited in claim 10, wherein each of the plurality of vertical bars are narrower than each of the plurality of chambers.

12. The reverse thrust braking method as recited in claim 9, wherein the plurality of chambers creates an initial variable velocity of the air.

13. The reverse thrust braking method as recited in claim 9, wherein the plurality of chambers creates different velocities of air in each of the plurality of chambers.

14. The reverse thrust braking method as recited in claim 9, wherein when the air reaches the exit point, velocity of the air within the system equalizes, and velocity of the air being exhausted increases, thereby creating the reverse thrust.

15. The reverse thrust braking method as recited in claim 9, further comprising activating a sensor that initiates the inflow of air into the inlet, and accelerates the air with the propeller fan blade.

16. The reverse thrust braking method as recited in claim 9, wherein the system is mounted to a vehicle and the method is used in the vehicle traveling on a road at high speeds to slow the vehicle.

17. The reverse thrust braking method as recited in claim 9, wherein the system is mounted to a vehicle and the method is used in the vehicle traveling on a road to slow the vehicle in an emergency braking situation.

18. The reverse thrust braking method as recited in claim 9, wherein each of the plurality of bars are narrower than each of the plurality of chambers.

19. The reverse thrust braking system as recited in claim 1, wherein each of the plurality of bars are narrower than each of the plurality of chambers.

* * * * *